C. LE DUC.
IMPLEMENT FOR STOPPING PNEUMATIC TIRED VEHICLES.
APPLICATION FILED JUNE 4, 1913.
1,094,226.  Patented Apr. 21, 1914.
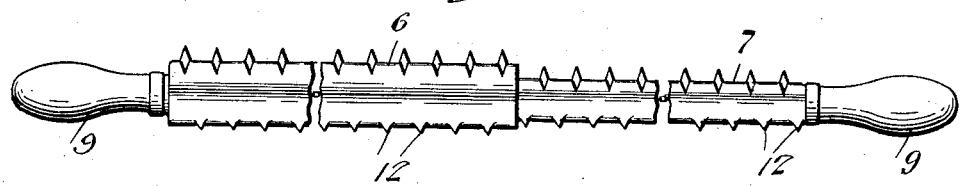
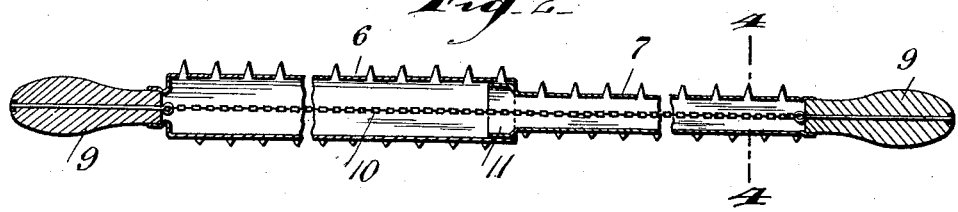
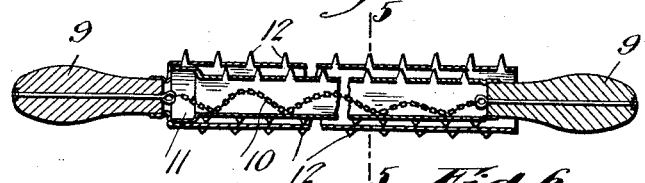
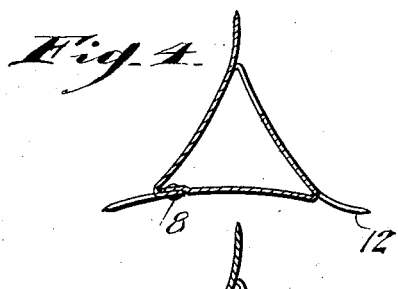
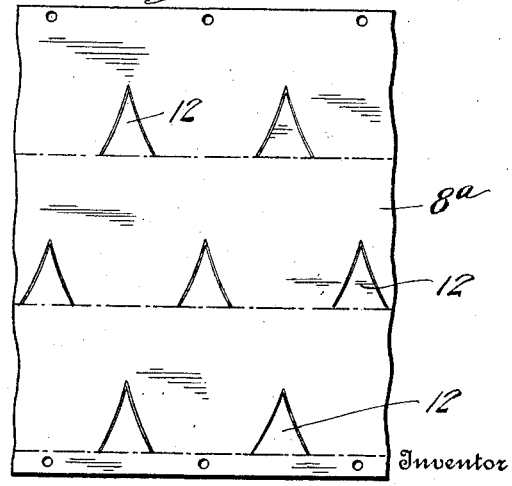
Witnesses
Inventor
Constant LeDuc,
By Victor J. Evans
Attorney

UNITED STATES PATENT OFFICE.

CONSTANT LE DUC, OF CHATSWORTH, NEW JERSEY.

IMPLEMENT FOR STOPPING PNEUMATIC-TIRED VEHICLES.

1,094,226.  Specification of Letters Patent.  Patented Apr. 21, 1914.

Application filed June 4, 1913. Serial No. 771,741.

*To all whom it may concern:*

Be it known that I, CONSTANT LE DUC, a citizen of the United States, residing at Chatsworth, in the county of Burlington and State of New Jersey, have invented new and useful Improvements in Implements for Stopping Pneumatic - Tired Vehicles, of which the following is a specification.

Operators of automobiles and kindred vehicles frequently violate traffic regulations, and it becomes the duty of an officer, or other person vested with authority, to prevent such infractions of the law to bring the operators of the machines to account and this entails a stopping of the machine or vehicle. It not unfrequently happens that the operator will not heed a command to stop, but on the contrary makes an effort to get away by increasing the speed of the machine.

The purpose of this invention is the provision of an implement which may be thrown in the path of the automobile or vehicle to puncture the tire and thereby compel the operator to bring the machine to a standstill.

The invention consists of a bar comprising telescoping sections, each provided in its length with rows of teeth or spurs, some of which will always project vertically so as to penetrate the tire and cause deflation thereof, such spurs or teeth being closely related and sharpened to insure the penetration of the tire to cause escape of the air therefrom, the inner section having its inner end enlarged, and both sections having handles at their outer ends and limited in their outward movement by means of a flexible connection.

The invention consists of the novel features, details of construction and combination of parts, which hereinafter will be more particularly set forth, illustrated in the accompanying drawing, and pointed out in the appended claim.

Referring to the drawing, forming a part of the specification, Figures 1 and 2 are respectively an elevation and a longitudinal section of an implement embodying the invention. Fig. 3 is a longitudinal section of the implement having the parts telescoped. Figs. 4 and 5 are enlarged sections on the lines 4—4 and 5—5 respectively of Figs. 2 and 3. Fig. 6 is a detail view of part of the sheet metal blank from which each of the parts of the implement is formed.

Corresponding and like parts are referred to in the following description, and indicated in all the views of the drawing, by the same reference characters.

The implement consists of a bar which may be of any length and of any cross sectional outline, said bar being provided in its length with rows of spurs or teeth, which are closely related and of such a length as to penetrate a pneumatic tire and cause deflation thereof. While the bar may be of any outline in cross section it is preferred to have the same of such configuration that when thrown upon the roadway some one of the rows of spurs or teeth will project vertically so as to penetrate and puncture the tire of the vehicle passing thereover. The form best adapted for the purpose is shown in Figs. 4 and 5 and is triangular, the sides being concave to give greater prominence to the spurs or teeth. As shown most clearly in Figs. 4 and 5 two rows of the spurs or teeth engage the surface of the roadway, with the result that the third row of spurs or teeth will occupy a vertical position so as to penetrate and puncture the tire passing thereover. Handles are located at the ends of the bar for convenience of manipulation and to prevent injury to the hand of the officer or other person supplied with the implement.

In the preferable construction the bar comprises telescoping parts 6 and 7 each being of similar formation and constructed of a sheet metal blank 8ª which is bent intermediate of its longitudinal edges into triangular form with the edge portions overlapping and secured by means of rivets 8 or like fastenings. Each of the parts is provided at its outer end with a handle 9, the two handles being connected by means of a chain 10 which limits the outward movement of the parts. The inner end of the part 7 is enlarged as indicated at 11 to snugly fit within the part 6 to hold the parts in alinement when extended. V-shaped portions are partly cut from the blanks 8 and are pressed outwardly to form teeth 12, said teeth being in a line with the angles formed between adjacent sides of the parts. When the parts are telescoped as indicated in Fig. 3 the length of the implement is materially reduced. When the parts are extended the implement is lengthened to such an extent as to insure a portion coming in the path of a wheel of the vehicle when the implement is thrown in advance of the machine to puncture a tire thereof.

When an officer or other person invested with authority commands the operator of an automobile to bring his machine to a stop because of an infraction of a regulation or law and such operator endeavors to get away by speeding the machine the officer throws the implement upon the roadway in position to insure the passage of one of the wheels thereover and such wheel in its passage has its tire punctured, thereby causing deflation and compelling the operator to bring the machine to a standstill when the officer may apprehend the operator in the usual manner.

Having thus described the invention what is claimed as new, is:—

An implement of the character described comprising telescoping parts of similar formation, each having rows of outwardly extending teeth and the inner part having its inner end enlarged, handles at the outer ends of the parts and a flexible connection joining the handles and limiting the outward movement of the parts.

In testimony whereof I affix my signature in presence of two witnesses.

CONSTANT LE DUC.

Witnesses:
 NORMAN J. SMITH,
 SELINA DEACON.